United States Patent
Schwarzbich et al.

(10) Patent No.: US 8,740,466 B2
(45) Date of Patent: Jun. 3, 2014

(54) ROLLING BEARING FOR A SHAFT

(75) Inventors: Jörg Schwarzbich, Bielefeld (DE); Thomas Ullrich, Bielefeld (DE)

(73) Assignee: Rollax GmbH & Co. KG, Bad Salzuflen (DE)

( * ) Notice: Subject to any disclaimer, the term of this patent is extended or adjusted under 35 U.S.C. 154(b) by 0 days.

(21) Appl. No.: 13/818,656

(22) PCT Filed: Sep. 29, 2011

(86) PCT No.: PCT/EP2011/066999
§ 371 (c)(1),
(2), (4) Date: Feb. 22, 2013

(87) PCT Pub. No.: WO2012/049029
PCT Pub. Date: Apr. 19, 2012

(65) Prior Publication Data
US 2013/0294717 A1  Nov. 7, 2013

(30) Foreign Application Priority Data

Oct. 12, 2010  (DE) ...................... 20 2010 008 787 U

(51) Int. Cl.
*F16C 43/04* (2006.01)

(52) U.S. Cl.
USPC ............................ 384/537; 384/560; 384/585

(58) Field of Classification Search
USPC ......... 384/513–516, 537, 560, 569, 584, 615, 384/622
See application file for complete search history.

(56) References Cited

U.S. PATENT DOCUMENTS

| | | | | |
|---|---|---|---|---|
| 3,033,622 A | * | 5/1962 | Renner | 384/537 |
| 4,523,861 A | * | 6/1985 | Stella | 384/475 |
| 4,964,742 A | | 10/1990 | Kagawa et al. | |
| 5,482,383 A | * | 1/1996 | Gantt et al. | 384/513 |
| 5,487,613 A | * | 1/1996 | Waskiewicz | 384/539 |
| 5,511,887 A | | 4/1996 | Waskiewicz | |

FOREIGN PATENT DOCUMENTS

| | | |
|---|---|---|
| DE | 484148 A | 10/1929 |
| DE | 7019258 U | 10/1971 |
| DE | 2845626 A1 | 4/1979 |
| DE | 4016839 A1 | 11/1991 |
| DE | 102004050728 A1 | 4/2006 |
| DE | 102004048172 A1 | 6/2006 |
| DE | 102009003230 A1 | 11/2010 |
| EP | 1273812 A1 | 1/2003 |
| FR | 2003086 A1 | 11/1969 |
| GB | 1326070 | 8/1973 |
| WO | 93/12353 A1 | 6/1993 |
| WO | 2010/037641 A1 | 4/2010 |

\* cited by examiner

*Primary Examiner* — Phillip A Johnson
(74) *Attorney, Agent, or Firm* — Richard M. Goldberg

(57) ABSTRACT

A roller bearing for a shaft that has a cylindrical peripheral surface, the bearing including a race (12) to be fitted onto the shaft, and roller bodies (16) arranged to roll on the race (12), the race (12) having a polygonal internal cross-section, so that it engages the peripheral surface of the shaft only in the vicinity of the center of each side (28) of the polygon.

6 Claims, 1 Drawing Sheet

ROLLING BEARING FOR A SHAFT

BACKGROUND OF THE INVENTION

The invention relates to a roller bearing for a shaft that has a cylindrical peripheral surface, the bearing comprising a race to be fitted onto the shaft, and roller bodies arranged to roll on the race.

The term "shaft" as used herein relates generally to a rotatable member that has a cylindrical peripheral surface that is surrounded by the race of the roller bearing.

Typically, the roller bearing has, in addition to the race fitted on the shaft, an outer race that forms, with the inner race, an annular gap in which the roller bodies are accommodated such that they roll on the outer peripheral surface of the inner race and on the inner peripheral surface of the outer race.

The races of such roller bearings have commonly been manufactured by machining, e.g. milling a metal blank. DE 10 2004 048 172 A1 discloses a method of manufacturing a race for a roller bearing from a deep-drawn metal sleeve without machining.

In order for the race to be in correct fitting engagement with the shaft, both the shaft and the race must have only small dimensional tolerances.

SUMMARY OF THE INVENTION

It is an object of the invention to provide a roller bearing wherein larger dimensional tolerances of the shaft and the inner race are permitted.

In order to achieve this object, the race has a polygonal internal cross-section, so that it engages the peripheral surface of the shaft only in the vicinity of the center of each side of the polygon.

Then, diameter tolerances of the shaft and/or tolerances of the internal diameter of the race can be absorbed by elastic deformation of the sides of the polygon, so that the internal surface of the race is widened and adapted to the actual diameter of the shaft. The total amount of elastic deformation is so small that the outer peripheral surface of the race, on which the roller bodies roll off, will practically not deviate from the circular shape. Since the corners of the polygon will normally not touch the peripheral surface of the shaft, the area of contact between the race and the peripheral surface of the shaft will be significantly smaller for the bearing according to the invention than for a conventional bearing in which the race has a circular internal cross-section. This, however, does not reduce the force-fit between the race and the shaft because the radial forces that act between the shaft and the race are concentrated on the relatively small zones in the vicinity of the center of each side of the polygon, so that the pressing forces are correspondingly high. When, due to manufacturing tolerances, a situation occurs in which the external diameter of the shaft is larger than the smallest internal diameter of the race (as measured from the center of one side of the polygon to the center of the opposite side of the polygon), the sides of the polygon may yield elastically, without the lengths of these sides being increased by a significant amount. For this reason, even when the tolerances are relatively large, the tensional strains acting in circumferential direction of the race remain so small that they do not lead to a rupture of the race.

Advantageous embodiments and further developments of the invention are indicated in the dependent claims.

In a preferred embodiment, the race has, as seen in an axial section, a wave profile that engages the peripheral surface of the shaft with at least one inner vertex (wave trough), whereas at least one outer vertex (wave crest) forms a race surface for the roller body. In this case the race needs to have the polygonal cross-section only in the vicinity of the wave troughs, whereas it may have a circular external cross-section in the vicinity of the wave crests. Then, in case of an excessive diameter of the shaft, the elastic deformation of the sides of the polygon will affect only the wave trough portions, whereas the wave crests are practically not deformed.

In a particularly preferred embodiment the race has, as seen in longitudinal section, the shape of a "M" or "W", so that two wave troughs engage the peripheral surface of the shaft and two wave crests define the race surface for the roller bodies. Then, for spherical or barrel-shaped roller bodies with positive crown, the two wave crests have also the effect to center to roller body. When the race has an M-shaped profile with three wave troughs and two wave crests, the central wave trough located between the two wave crests has preferably a larger internal diameter than the two outer wave troughs, so that the race will engage the peripheral surface of the shaft only with the outer wave troughs and needs to have the polygonal cross section only in these areas.

The race can be manufactured by metal-forming of a cylindrical metal body. For example, the wave profile of the race may be obtained by rolling a tubular body, and subsequently a polygonal mandrel is inserted into the race so that the wave trough areas are deformed such that the internal peripheral surface assumes the polygonal cross-section. The tubular body may itself be formed from a flat blank of sheet metal by first drawing the blank into a pot-shaped configuration and then cutting off the bottom of the pot and a flange at the outer periphery of the pot, as the case may be.

An embodiment example will now be explained in conjunction with the drawings, wherein:

DETAILED DESCRIPTION

Figure 1:
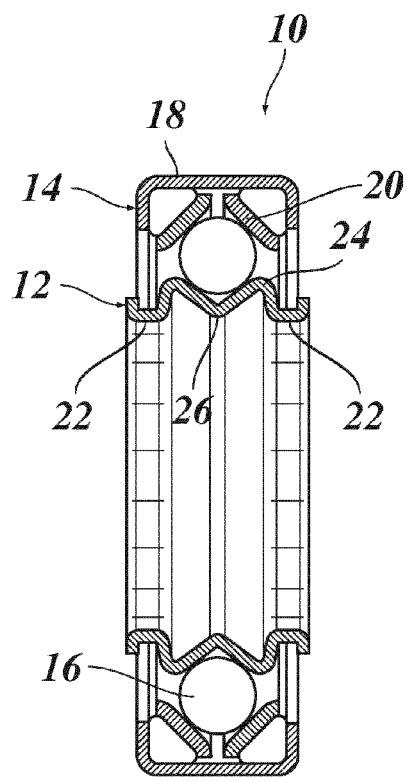
FIG. 1 shows an axial section of a roller bearing according to the invention.

The roller bearing 10 shown in FIG. 1 comprises an inner race 12, an outer race 14, and a plurality of roller bodies which are shaped as balls 16 in this example.

The outer race 14 is composed of several parts and comprises a casing 18 in which two conical rings 20 are arranged mirror-symmetrically and supported such that they define a V-shaped race surface for the balls 16.

The inner race 12 is formed by a metal sheet of uniform thickness that has been transformed into a wave profile. In this example, the wave profile has approximately the shape of an "M" (when considering the section through the top part in FIG. 1) and forms two wave troughs 22 that are flattened at the inner periphery, with two wave crests 24 and a central wave trough 26 interposed therebetween. The two wave crests 24 define a race surface for the balls 16. In the example shown the wave crests 24 are asymmetrical, so that their outer flanks which slope towards the wave troughs 22 are steeper than the inner flanks on which the balls 16 roll off.

Figure 2:
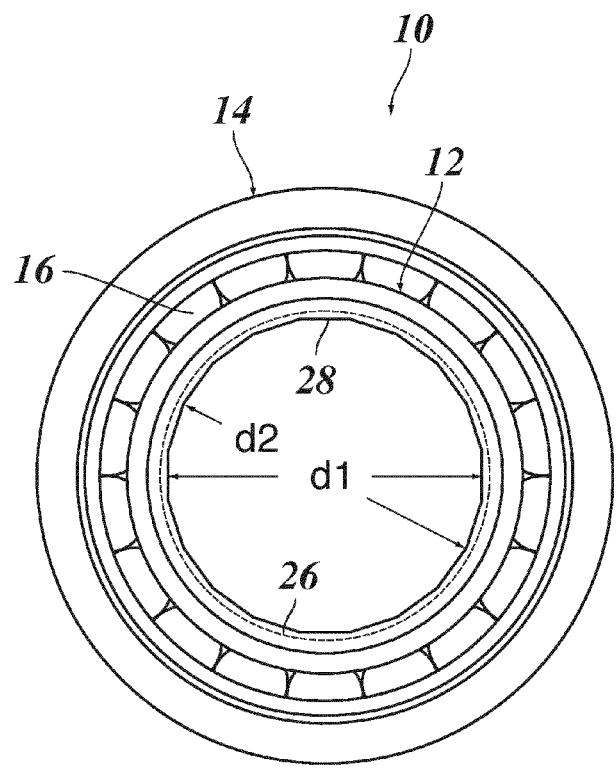
FIG. 2 shows a front-view of the roller bearing.

As can be seen more clearly in FIG. 2, the cross-section of the inner peripheral surfaces of the wave troughs 22 is not circular but polygonal. In the example shown, the internal cross-section is shaped as a regular icosagon having 20 sides 28 of equal length which are straight under normal conditions. Optionally, the number of corners and, therewith, the number of sides 28 may also be larger or smaller, but the number of sides should preferably be at least 10.

Due to the polygonal cross-section, the internal diameter of the inner race 12 varies between a minimum diameter d1, as measured from side center to side center, and a maximum diameter d2, as measured from corner to corner. The internal diameter of the central wave trough 26 is larger than d2, so that the innermost surface regions of the race 12 are formed by the polygonal inner peripheral surfaces of the two wave troughs 22.

Figure 3:
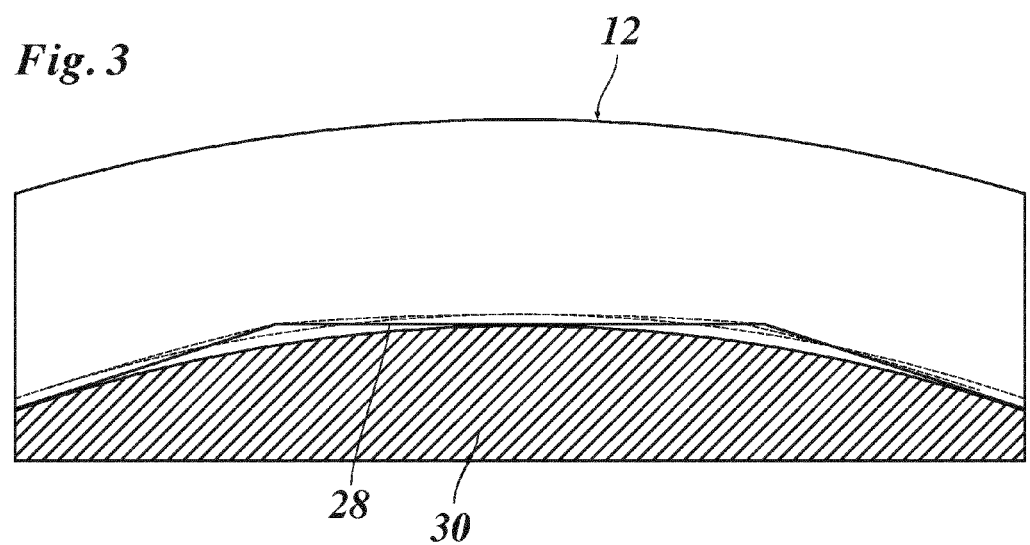
FIG. 3 shows a detail of FIG. 2.

As is shown in FIG. 3, the roller bearing 10 serves for supporting a shaft 30 that has a cylindrical peripheral surface. The inner race 12 of the roller bearing 20 is fitted onto the cylindrical peripheral surface of the shaft, so that all twenty sides 28 of the polygon form tangents to the peripheral surface of the shaft 30, whereas the corners of the polygon are spaced apart from this peripheral surface. A force-fit between the shaft 30 and the race 12 is assured as long as the external diameter of the shaft 30 is at least d1. If the shaft has, due to manufacturing tolerances, a somewhat larger diameter, then the regions of the wave troughs 22 which form the sides 28 of the polygon may elastically bulge outwardly as has been indicated in dashed lines in FIG. 3. Thus, as long as the external diameter of the shaft 30 is smaller than d2, the manufacturing tolerances can be absorbed elastically without causing excessive tensional strains in the inner race 12, which would cause a rupture of the race.

Thanks to the wave profile of the race 12, the elastic deformations of the sides 28 are limited to the inner vertices of the wave troughs 22, whereas the wave crests are practically not influenced thereby and still form an almost perfect circular race surface for the balls 16.

In the example shown, the inner race 12 has, on both ends, on the outward sides of each of the two wave troughs 22, a flange that projects radially outwardly and makes it easier to thrust the roller bearing onto the shaft 30. In addition to the fixation of the roller bearing 10 on the shaft 30 that is achieved by the force fit, other means such as claw rings may be used for achieving an additional axial fixation of the roller bearing, especially the inner race 12 thereof, on the shaft 30. Optionally, the claws for such an axial fixation may be formed integrally with one of the flanges of the race 12.

What is claimed is:

1. A roller bearing for a shaft that has a cylindrical peripheral surface, the bearing comprising:
   a race adapted to be fitted onto the shaft, the race having an internal cross-section in the shape of a polygon, so that the race engages the peripheral surface of the shaft only in the vicinity of a center of each side of the polygon,
   roller bodies arranged to roll on the race, and
   wherein the race has, in an axial section, a wave profile with at least one wave trough having an inner vertex of which forms the polygonal internal cross-section of the race, and at least one wave crest forming a race surface for the roller bodies.

2. The roller bearing according to claim 1, wherein the number of sides of the polygon is at least ten.

3. The roller bearing according to claim 1, wherein the at least one wave crest comprises at least two wave crests and the at least one wave trough comprises at least two wave troughs the inner vertices of which form the polygonal internal cross-section.

4. The roller bearing according to claim 3, wherein the at least two wave crests are axially arranged between the at least two wave troughs and are separated from one another by another wave trough.

5. The roller bearing according to claim 4, wherein the race includes an inner diameter at an inner vertex of the another wave trough that is located between the at least two wave crests which is larger than a maximum internal diameter of the polygonal internal cross-section.

6. A roller bearing for a shaft that has a cylindrical peripheral surface, the bearing comprising:
   a race adapted to be fitted onto the shaft, the race having an internal cross-section in the shape of a polygon, so that the race engages the peripheral surface of the shaft only in the vicinity of a center of each side of the polygon, wherein the race is formed by a shaped sheet metal, and roller bodies arranged to roll on the race.

\* \* \* \* \*